(12) United States Patent
Zhai et al.

(10) Patent No.: US 11,861,935 B2
(45) Date of Patent: Jan. 2, 2024

(54) FINGERPRINT DETECTION METHOD AND FINGERPRINT MODULE

(71) Applicant: Silead Inc., Shanghai (CN)

(72) Inventors: Heng Zhai, Shanghai (CN); Jun Yang, Shanghai (CN)

(73) Assignee: Silead Inc., Shanghai (CN)

( * ) Notice: Subject to any disclaimer, the term of this patent is extended or adjusted under 35 U.S.C. 154(b) by 0 days.

(21) Appl. No.: 17/992,590

(22) Filed: Nov. 22, 2022

(65) Prior Publication Data
US 2023/0316802 A1 Oct. 5, 2023

(30) Foreign Application Priority Data

Mar. 29, 2022 (CN) .......................... 202210319195.0

(51) Int. Cl.
*G06V 40/13* (2022.01)
*G06V 40/12* (2022.01)
*G06V 10/26* (2022.01)

(52) U.S. Cl.
CPC .......... *G06V 40/1365* (2022.01); *G06V 10/26* (2022.01); *G06V 40/1306* (2022.01)

(58) Field of Classification Search
CPC ..................................................... G06V 40/13
See application file for complete search history.

(56) References Cited

U.S. PATENT DOCUMENTS

| 2014/0035874 A1* | 2/2014 | Iizuka | G06F 3/04166 345/174 |
| 2015/0146944 A1* | 5/2015 | Pi | G06F 21/32 382/124 |
| 2016/0048840 A1* | 2/2016 | Lee | G06Q 20/3227 382/124 |
| 2017/0075700 A1* | 3/2017 | Abudi | G06F 3/0484 |
| 2017/0091523 A1* | 3/2017 | Chen | G06V 40/13 |
| 2020/0012844 A1* | 1/2020 | Kim | G06V 10/50 |
| 2021/0209329 A1* | 7/2021 | Bjerre | G06V 40/1306 |
| 2023/0086442 A1* | 3/2023 | Van Ostrand | G06F 3/0412 345/173 |

FOREIGN PATENT DOCUMENTS

| CN | 106055947 A | 10/2016 |
| CN | 105446451 B | 9/2019 |

* cited by examiner

*Primary Examiner* — Joseph R Haley
(74) *Attorney, Agent, or Firm* — Nutter McClennen & Fish LLP

(57) ABSTRACT

The embodiments of the present disclosure provide a fingerprint detection method and a fingerprint module. The fingerprint detection method includes: dividing a detection area of the fingerprint module into a plurality of detection blocks, wherein each of the detection blocks comprises a plurality of detection units, and each of the detection units is corresponding to a grayscale value; scanning at least part of the detection blocks to obtain the grayscale values; determining whether each of the detection blocks is in a covered state based on the grayscale values; and counting the number of the detection blocks in the covered state, and sending a collection request to a host to inform the host to obtain a fingerprint image if the number thereof is not less than a coverage block threshold. The method avoids meaningless detection caused by a false touch, and ensures integrity of the fingerprint image collected later.

17 Claims, 4 Drawing Sheets

FINGERPRINT DETECTION METHOD AND FINGERPRINT MODULE

CROSS-REFERENCE TO RELATED APPLICATIONS

This application claims priority to Chinese Patent Application No. 202210319195.0 filed on Mar. 29, 2022, which is hereby incorporated by reference in its entirety.

TECHNICAL FIELD

The embodiments of the present disclosure relate to the technical field of sensors, and particularly to a fingerprint detection method and a fingerprint module.

BACKGROUND

With the development in the fields of mobile terminals, smart homes, automotive electronics, etc., the fingerprint identification technology has been widely used to ensure information security. Accurate recognition of a user's identity based on an input fingerprint is an essential condition for the application of the fingerprint identification technology. At present, when a fingerprint identification is performed, it generally utilizes a metal ring detection or a capacitance of a detection area to determine whether there is a finger touch, and if so, obtains a press image using the detection area and transmits the press image to a terminal device. However, the above real-time process can only determine that there is a finger touch at present, without a step for judging a press area of the finger in the detection area, i.e., a coverage rate corresponding to the detection area. When an image with a low coverage rate is used for the identity recognition, the image may be matched to a wrong pre-stored fingerprint image because of its fewer feature points, which may even lead to a successful fingerprint identification of criminals, thus causing information security problems. Therefore, there is an urgent need for a technical solution that can conveniently and effectively determine a fingerprint coverage rate during fingerprint detection.

SUMMARY

The embodiments of the present disclosure provide a fingerprint detection method and system, so as to solve the problem of how to conveniently and effectively determine the fingerprint coverage rate during the fingerprint detection.

In order solve the above technical problem, the embodiments of the present disclosure provide a fingerprint detection method for applying to a fingerprint module, the method comprising: dividing a detection area of the fingerprint module into a plurality of detection blocks, wherein each of the detection blocks comprises a plurality of detection units, and each of the detection units is corresponding to a grayscale value; scanning at least part of the detection blocks to obtain the grayscale values; determining whether each of the detection blocks is in a covered state based on the grayscale values; and counting the number of the detection blocks in the covered state, and sending a collection request to a host to inform the host to obtain a fingerprint image if the number is not less than a coverage block threshold.

The embodiments of the present disclosure further provide a fingerprint module, comprising: a detection area which is divided into a plurality of detection blocks, wherein each of the detection blocks comprises a plurality of detection units, and each of the detection units is corresponding to a grayscale value; and a hardware circuit configured to: scan the detection blocks to obtain the grayscale values; determine whether each of the detection blocks is in a covered state based on the grayscale values; and count the number of the detection blocks in the covered state, and send a collection request to a host to inform the host to obtain a fingerprint image if the number is not less than a coverage block threshold.

As can be seen from the technical solutions provided by the embodiments of the present disclosure, an effective detection area of the fingerprint module is divided into a plurality of detection blocks, wherein each of the detection blocks includes a plurality of detection units, and each of the detection units is corresponding to a grayscale value. When a fingerprint detection is to be performed, firstly at least part of the detection blocks are scanned to obtain the grayscale values. Next, it is determined whether each of the detection blocks is in a covered state based on the grayscale values; the number of the detection blocks in the covered state is counted, and if the number thereof is not less than a coverage block threshold, a collection request is sent to a host to inform the host to obtain a fingerprint image. With the above method, before the fingerprint collection is performed, the determination and judgment of the coverage rate of the detection area is realized based on the fingerprint module itself, and the fingerprint image will not be collected or identified unless the coverage rate meets a certain requirement, which not only avoids meaningless detection caused by a false touch, but also ensures the integrity of the fingerprint image collected later, thus improving the accuracy of the identification result, and ensuring the practical application effect of the fingerprint identification. In addition, in the embodiments of the present disclosure, firstly the grayscale values are scanned in units of the detection blocks to determine whether each of the detection blocks is in the covered state, and then the coverage rate is determined according to the number of the blocks in the covered state, which can avoid the influence of the grayscale values of a local detection area on the coverage rate of the entire detection area, and make the determined coverage rate more accurate. In addition, compared with the scanning of the entire detection area, the scanning of the grayscale values in units of detection blocks requires less hardware overhead.

BRIEF DESCRIPTION OF THE DRAWINGS

For a clearer illustration of the embodiments of the present disclosure or the prior art, a brief description of the drawings for the embodiments or the prior art will be given below. The drawings described below involve only some embodiments of this disclosure. For those of ordinary skill in the art, other drawings can be derived from these drawings without any inventive efforts.

DESCRIPTION OF EMBODIMENTS

A clear and complete description of the embodiments of the present disclosure will be set forth with reference to the drawings. Obviously, the described embodiments are only a part, rather than all, of the embodiments of the present disclosure. All other embodiments derived by persons skilled in the art from the embodiments of the present disclosure without making inventive efforts shall fall within the scope of the present disclosure.

Figure 1:
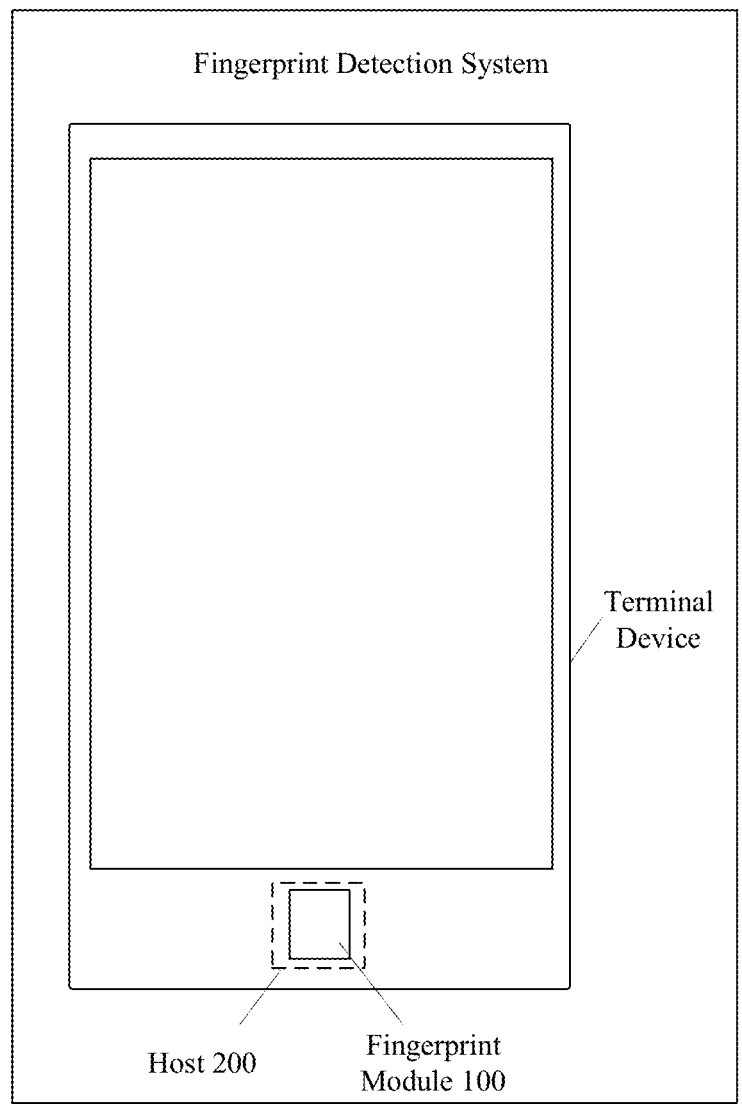
FIG. 1 is a structural diagram of a fingerprint detection system according to an embodiment of the present disclosure.

For a better description of the technical concept of the present disclosure, a fingerprint detection system in the embodiments of the present disclosure is introduced firstly. As illustrated in FIG. 1, the fingerprint detection system includes a fingerprint module 100 and a host 200.

Figure 2:
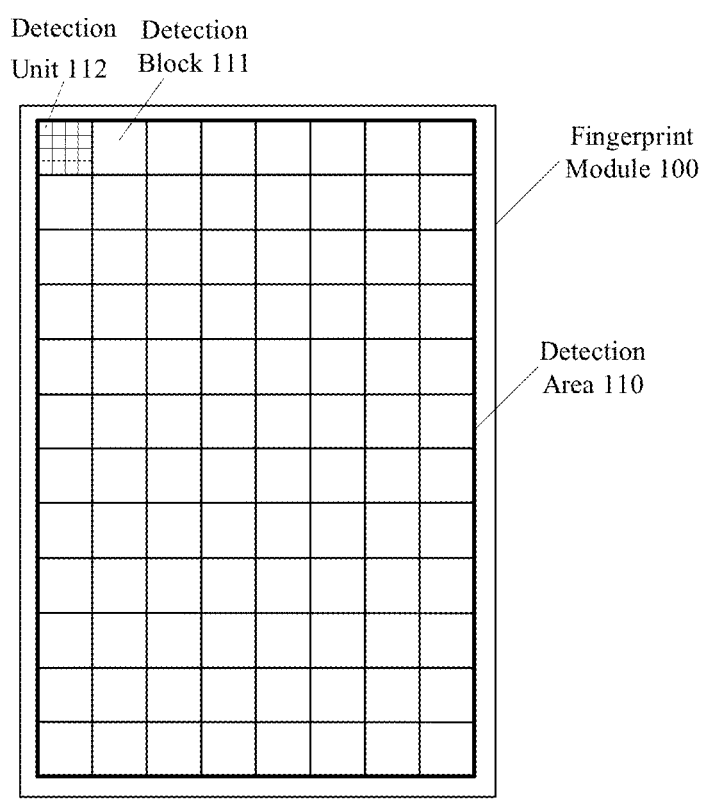
FIG. 2 is a schematic diagram of a detection area according to an embodiment of the present disclosure.

The fingerprint module 100 may be configured to collect a fingerprint. As illustrated in FIG. 2, a detection area 110 is provided on a surface of the fingerprint module 100. The detection area 110 may be an area where a user places a finger to collect a fingerprint thereof, or an active area of a fingerprint chip in the fingerprint module 100.

The detection area 110 is divided into a plurality of detection blocks 111, each including a plurality of detection units 112. Exemplary, all of the detection blocks have a same area. When the user places a finger on the detection area 110, different detection units 112 can be scanned with corresponding grayscale values. In one embodiment, the detection unit 112 includes a capacitance sensing unit. Each grayscale value is corresponding to a sensing capacitance of the corresponding detection unit 112, so as to reflect a distance between the detection unit 112 and a corresponding measured part of a finger surface. After grayscale values corresponding to all the detection units 112 are obtained, the uneven distribution of the finger surface may be determined by combining the magnitudes and distribution of the grayscale values of all the detection units 112, thereby constructing a finger fingerprint image.

In one embodiment, the detection unit 112 includes a capacitance sensing unit, which generates a sensing capacitance in response to being touched by a measured part, and converts the sensing capacitance into an analog electrical signal that is converted into a digital signal by an ADC (analog-to-digital converter). The digital signal corresponding to each of the detection units 112 is called as a grayscale value, which indicates the distance between the measured part and the detection unit 112. Taking the ADC with 8 bits as an example, a range of the grayscale value is 0 to 255. The sensing capacitance varies with the distance between the detection unit 112 and the corresponding measured part of the finger surface. When there is no finger press, the sensing capacitance is the minimum, and the corresponding grayscale value is the maximum, which is 255; when there is a finger press, the sensing capacitance increases, and the grayscale value decreases. When the example is applied to the embodiments of the present disclosure, if the grayscale value obtained by scanning the detection unit 112 is 0, it may indicate that the surface of the detection unit 112 is covered by an object; if the converted grayscale value is 255, it may indicate that the corresponding surface of the detection unit 112 is not covered by any object. In practical applications, due to the influence of external factors and measurement deviation, it may be considered that there is an object covering when the grayscale value is 0 to 60, and there is no coverage when the grayscale value is 200 to 255. This range may also be adjusted as needed, which is not limited here. It should be noted that in some embodiments of the present disclosure, when a press (touch) detection and a coverage rate detection are performed, it is only necessary to determine whether a press is applied, without requiring a fingerprint image to be constructed, thus a high gain setting may be adopted, and a minimum grayscale value may reach 0.

When a scan that normally collects a fingerprint image is performed, it is necessary to cause a difference between the grayscale values of valleys and ridges to construct the fingerprint image, and an appropriate gain setting may be selected.

FIG. 2 is a schematic diagram of a detection area 110. In this example, the detection area 110 is divided into 8×12 detection blocks 111, each including four rows and four columns (4×4) of detection units 112. As the minimum sensing unit, each of the detection units 112 may independently output a grayscale value. By taking the detection block 111 as a unit, the detection units 112 included therein are scanned for the grayscale values, i.e., it is determined whether there is an object coverage on each block, and then determine an overall coverage rate of the detection area 110 by combining the determination results of the blocks.

The fingerprint module 100 further includes a hardware circuit, which may scan each of the detection blocks to obtain a grayscale value, and determine whether the detection block is in a covered state based on the grayscale value. The hardware circuit can count the number of the detection blocks in a covered state, and send a collection request to a host when the number is not less than a coverage block threshold, so as to obtain a fingerprint image through the host. Specifically, the hardware circuit further includes a scanning module, a coverage determination module, a counting module, a comparison module, and an interruption module. The scanning module is configured to scan the detection units 112 in each of the detection blocks 111 row by row and column by column to obtain the grayscale values. In one embodiment, the scanning specifically includes converting the sensing capacitance of each of the detection units 112 into an analog voltage, and then converting the analog voltage into a grayscale value through a gain amplification (in some embodiments, the gain amplification is not required) and an analog-to-digital conversion (ADC). The coverage determination module is configured to determine whether each of the detection blocks 111 is in a covered state based on the grayscale values in the detection block 111. The counting module is configured to count the number of the detection blocks 111 in the covered state. The comparison module is configured to compare the number of the detection blocks 111 in the covered state to the coverage block threshold. The interruption module is controlled by the comparison module to send a collection request to the host 200 to inform the host 200 to obtain a fingerprint image. The host 200 may receive the collection request sent by the fingerprint module 100, and obtain a fingerprint image for fingerprint identification based on the collection request. The host 200 and the fingerprint module 100 may communicate with each other, and the host 200 may send a corresponding instruction to the fingerprint module 100 and receive a fingerprint image from the fingerprint module 100. Specifically, the communication between the host 200 and the fingerprint module 100 may be realized through an interface such as SPI. The host 200 may use its own processor to process and identify the fingerprint image to determine an identification result. In one embodiment, the host 200 may be always in a sleep state until receiving the collection request sent by the fingerprint module 100. The fingerprint module 100 in the embodiments of the present disclosure will not send the collection request to the host 200 to wake up the host 200 unless it is determined that the number of the detection blocks 111 in the covered state reaches a threshold, thus avoiding a false wake-up and further saving the power consumption.

The host 200 may be provided in a terminal device, which is a corresponding device to be used by the user and can provide different services to the user. The terminal device is exemplarily shown as a smart phone in FIG. 1, but is not limited thereto in practical applications. For example, the terminal device may also be any other portable electronic device such as a tablet, a notebook, a personal computer, etc., or a device with a fingerprint identification function such as a smart fingerprint door lock, an information collection device, etc. The host 200 in the terminal receives the fingerprint image from the fingerprint module 100 and performs a fingerprint image identification to complete fingerprint verification. After that, the host 200 may control the terminal device to perform subsequent operations, such as unlocking, based on the identification result.

In practical applications, the host 200 may be provided not only in the terminal device, but also inside the fingerprint module 100. The host 200 inside the fingerprint module 100 may be implemented by a micro-control unit (not shown in FIG. 1), such as a microcontroller or microprocessor. The micro-control unit may store a preset fingerprint template in advance, and after the fingerprint image is collected by the fingerprint module 100 and transmitted to the micro-control unit, the micro-control unit may process and identify the fingerprint image and obtain a corresponding identification result. For example, in the embodiments of the present disclosure, the micro-control unit corresponding to the fingerprint module 100 may only have a fingerprint identification function, and after the corresponding fingerprint identification result is obtained, it is sent to the terminal device 200, so that the terminal device can perform subsequent operations, such as unlocking.

Figure 3:
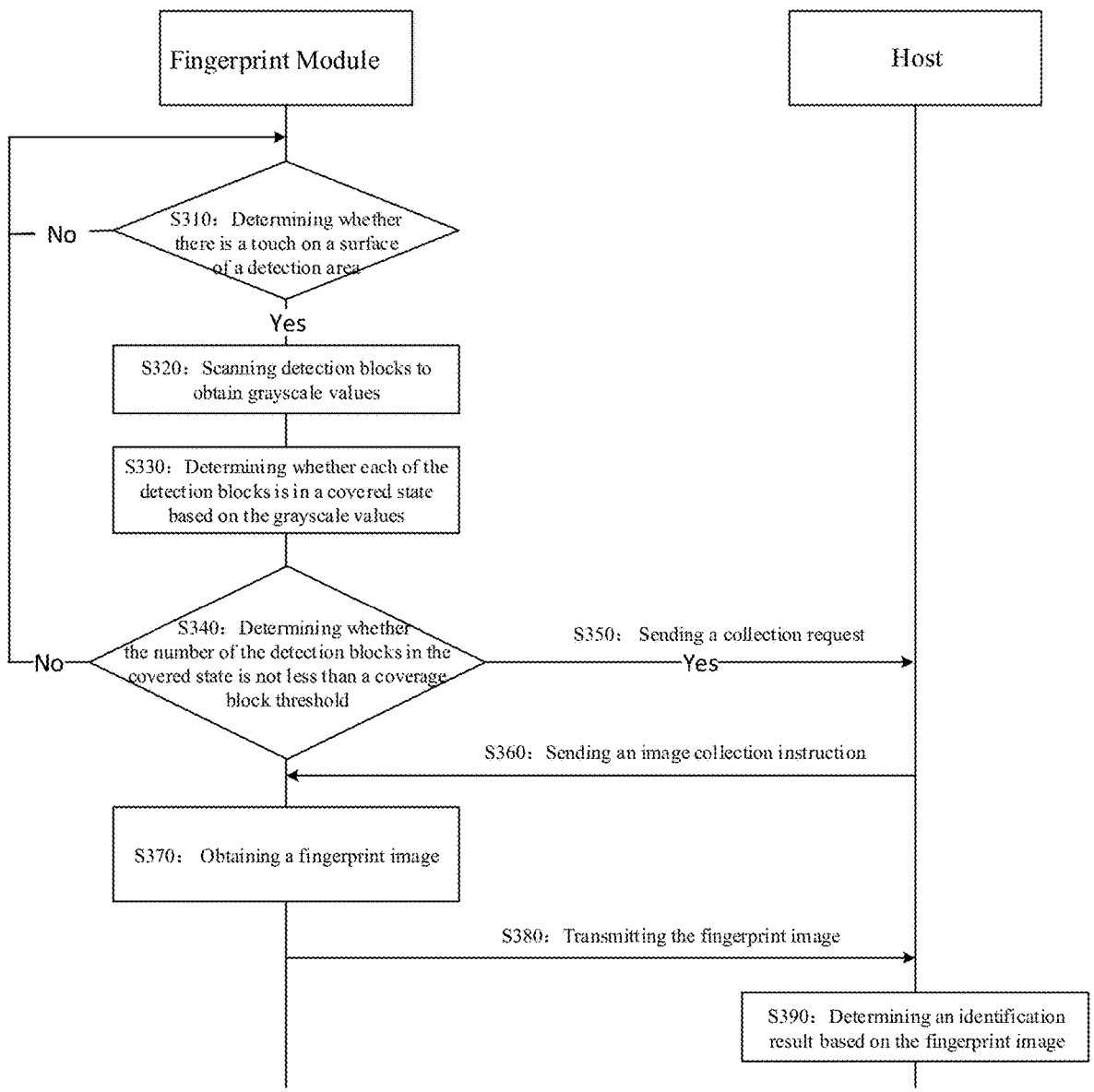
FIG. 3 is a flowchart of a fingerprint detection method according to an embodiment of the present disclosure.

Based on the above fingerprint detection system, a fingerprint detection method in the embodiments of the present disclosure will now be introduced. The fingerprint detection method is performed by the fingerprint detection system. As illustrated in FIG. 3, the fingerprint detection method specifically includes the following steps.

S310: a fingerprint module determines whether there is a touch/press on a surface of a detection area.

In the actual fingerprint detection, if the fingerprint image is directly collected without determining the coverage rate, the collected fingerprint image may not be a complete fingerprint of the user, which leads to fewer feature points therein, and it is easy to misjudge when a fingerprint identification is performed, such that a user who is not qualified for fingerprint login will be permitted, which affects the identification accuracy and the data security. Therefore, before the fingerprint image for identification is collected, it is necessary to determine the coverage rate of the detection area 110 to ensure the integrity of the collected fingerprint image.

However, all or most detection blocks 111 should be used when the coverage rate is determined. If the detection blocks 111 are continuously scanned and the coverage rate of the detection area is determined in real time based on the scan results, the detection effect of the coverage rate can be ensured, but the power consumption of the fingerprint module 100 will be increased. In practical applications, the surface of the fingerprint module 100 is not pressed by the finger or other objects most of the time. When the detection blocks 111 are continuously scanned to determine the coverage rate, it is inevitable that no scan result can be obtained for a long time, which obviously increases unnecessary power consumption. Therefore, in one embodiment, before the detection of the coverage rate, it may be determined whether there is a press (touch) on the surface of the detection area 110 at present, and if so, the detection for determining the coverage rate may be performed.

Thus, in order to realize a press (touch) detection, in some embodiments, the fingerprint module 100 may scan a plurality of specific detection units 112 at an interval of a predetermined time period to obtain the touch grayscale values output from these detection units 112, and determine whether there is a press or touch on the surface of the detection area 110 based on the touch grayscale values.

In one embodiment, the specific detection units 112 may only be those at specific positions among all the detection units 112 in the entire detection area 110 of the fingerprint module 100, so as to control the power consumption of the press detection. The specific detection units 112 may output the touch grayscale values, respectively, for determining whether there is an object press or touch on the outer surface of the detection area 110, thus realizing the press (touch) detection.

When the fingerprint module 100 controls the scanning of the specific detection units 112 to obtain the touch grayscale values, the specific detection units 112 may be scanned one by one. In practical applications, since the scanning time of the detection unit 112 is very short, the scanning of the all the specific detection units 112 can be completed in a short time even if they are scanned one by one, which has no influence on the press detection and judgment and the subsequent coverage rate detection in practical applications.

For a better understand of the press (touch) detection and the subsequent coverage rate detection in this embodiment, the working principle of the detection unit 112 will be firstly introduced. The detection unit 112 is the smallest detection unit of the detection area 110, and one detection unit 112 may be corresponding to one pixel in the detection area 110. When there is a pressing object on the surface of the detection area 110, the surface of the object is taken as the measured part. If the measured part is uneven, the distance between a different detection unit 112 and the measured part may be varied. Based on the different distances from the measured part, the detection unit 112 may sense different sensing capacitances, which will be processed by the circuit such as ADC and then output as digital signals of different values, i.e., different grayscale values. Specifically, there is a negative correlation between the grayscale value and the sensing capacitance. After receiving the grayscale values corresponding to the detection units 112, the hardware circuit of the fingerprint module 100 analyzes the distribution of the grayscale values in different positions (also called as the fingerprint image) to determine the uneven state of the surface of the measured part. Since the fingerprint is formed by valleys and ridges with different heights, and the detection of the fingerprint on the finger surface can be completed by the above way.

The grayscale value of the detection unit 112 is corresponding to the capacitance sensed by the detection unit 112. Therefore, in a case where the specific detection unit 112 is provided, it is determined whether there is an object on the surface of the specific detection unit 112 based on the corresponding grayscale value obtained by scanning the specific detection unit 112. For example, when the corresponding grayscale value is 255, it indicates that there is no finger or any other object pressing the surface of the specific detection unit 112. If the corresponding grayscale value is a touch threshold (configured according to different voltages, for example, the touch threshold could be 0 to 60), it indicates that the surface of the specific detection unit 112 is pressed by an object.

In a specific example, a touch accumulation value is obtained by accumulating the grayscale values of all the specific detection units 112, and the touch accumulation value is compared with the touch threshold to determine whether there is an object pressing the surface of the detection area 110. The touch threshold is preset to define a limit value of the touch accumulation value when there is a press by an object. If the touch accumulation value is not greater than the touch threshold, it indicates that there is an object pressing the surface of the detection area 110, and the fingerprint module 100 starts the subsequent step of scanning each of the detection blocks 111 to determine the coverage rate.

In another specific example, when it is determined whether there is an object pressing the surface of the detection area 110, the touch threshold may also be set for a single specific detection unit. After the grayscale values of the specific detection units 112 are obtained by scanning, each of the grayscale values may be compared with the touch threshold to separately determine whether the surface of each of the specific detection units 112 is pressed by an object, and the number of the specific detection units 112 having surfaces pressed by the object is counted. If the number is greater than a press unit threshold, it is determined that there is an object pressing the surface of the fingerprint module 100 at present, and the fingerprint module 100 starts the subsequent step of scanning each of the detection blocks 111 to determine the coverage rate.

Figure 4:
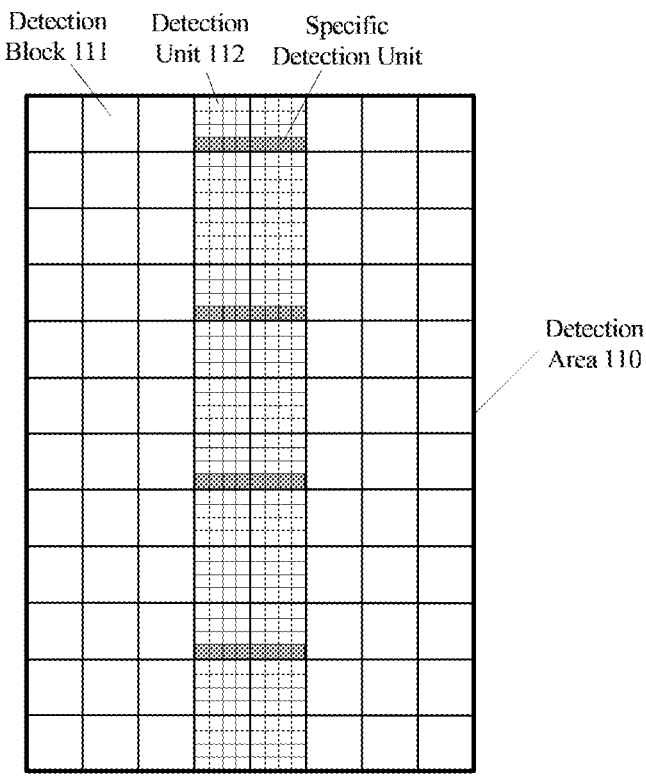
FIG. 4 is a schematic diagram of a detection unit for a press detection according to an embodiment of the present disclosure.

In addition, in order to prevent a tiny object from touching the detection area 110 and directly waking up the subsequent coverage rate detection operation, the specific detection units 112 may be evenly distributed on the detection area 110. FIG. 4 illustrates an example of setting the specific detection units 112, wherein among every 12 rows, 8 consecutive detection units 112 in the middle are set as the specific detection units 112. Based on this way of setting the specific detection units 112, the accuracy of the touch detection result is also ensured since there is generally no situation that an object just covers these specific detection units 112. As illustrated in FIG. 4, for example, 8 specific detection units 112 are selected from each row of the detection units 112, i.e., totally 32 specific detection units 112 are set, then the touch threshold may be a value obtained by multiplying the touch threshold corresponding to a single specific detection unit by 32.

The predetermined time period is a fixed time period, in which each of the specific detection units 112 is scanned based on a fixed frequency, so that the pressing behavior of the finger or any other object can be effectively detected. The length of the predetermined time period may be adjusted according to the requirements of actual applications, which is not limited here.

In order to realize the pressing detection, in some other embodiments, a metal ring may be provided on the surface of the fingerprint module 100. The metal ring may be connected to a corresponding detection circuit. Since the human body is electrically conductive, when the finger touches the metal ring, the detection circuit is conducted to generate corresponding sensing signal, which may be an electrical signal. After being generated, the sensing signal is transmitted to the hardware circuit, so that the hardware circuit can perform the operation of scanning the detection block and obtaining the grayscale value upon receipt of the sensing signal, which also realizes the detection of object touch.

The above embodiments may be used to detect the pressing operation in practical applications, and the corresponding detection mode may be selected based on the needs of practical applications, which is not limited here.

The touch detection of the surface of the detection area 110 may be realized based on the above mode. If the detection result is that there is an object pressing the surface of the detection area, currently there is a possibility that the finger presses the detection area 110, and the method turns to step S320 to perform the subsequent coverage rate detection operation. If the detection result is that there is no object pressing the surface of the detection area 110, step S310 may be repeatedly performed to perform the touch detection until the surface of the detection area is pressed by an object.

S320: the fingerprint module scans detection blocks to obtain grayscale values.

According to the embodiments of the present disclosure, the detection area 110 on the surface of the fingerprint module 100 is divided into a plurality of detection blocks 111, each composed of a plurality of detection units 112. For example, the detection block 111 may be composed of a row of detection units 112, a column of detection units 112, or a plurality of rows and columns of detection units 112. As illustrated in FIG. 2, the detection block 111 is composed of four rows and four columns (4×4) of detection units 112.

In practical applications, the fingerprint detection may be achieved by a capacitive fingerprint sensor or an optical fingerprint sensor. However, when the fingerprint detection is performed based on the optical fingerprint sensor, since the exposure time is much longer than the detection time, generally it is unnecessary to additionally set an operation of detecting the coverage rate and a time period thereof. Therefore, in the embodiment of the present disclosure, the detection unit 112 is a capacitance sensing unit. Accordingly, the fingerprint module 100 uses a principle of capacitance sensing to collect the fingerprint.

The principle of fingerprint detection will be further introduced below by taking the capacitance sensing unit as an example of the detection unit 112.

A parallel plate capacitor is formed between the capacitance sensing unit and the measurement area outside the surface thereof. Since an area of a parallel plate and a filling medium of the parallel plate capacitor are fixed, according to $C=\varepsilon*S/d$, a sensing capacitance of the parallel plate capacitor is inversely proportional to a distance between the parallel plates. Therefore, the capacitance of the parallel plate capacitor may reflect the distance between the measured part and the capacitance sensing unit.

When the measured part is the finger surface, since the skin on the finger surface forms fingerprints based on concave and convex portions and ridges and valleys on the fingerprints have different heights, the distance between different capacitance sensing units and the fingerprint at the corresponding position is varied, so that the capacitance of the parallel plate capacitor corresponding to the ridge is larger and the capacitance of the parallel plate capacitor corresponding to the valley is smaller. The fingerprint image of a user is drawn according to the digital signal (i.e. the grayscale value) obtained by the analog-to-digital conversion (ADC) of the analog voltage signal corresponding to the sensing capacitance of each of the capacitance sensing unit. That is, different capacitance sensing units have corresponding sensing capacitances based on their distances to the measured part, and the capacitance sensing unit may output the corresponding grayscale value based on the sensing capacitance. Generally, there is a negative correlation between the grayscale value and the sensing capacitance, i.e., the sensing capacitance of the capacitance sensing unit decreases as the grayscale value increases, and the sensing capacitance of the capacitance sensing unit increases as the grayscale value decreases.

When the detection blocks 111 are scanned, all the detection blocks 111 may be scanned one by one, i.e., row by row or column by column. Specifically, the detection units 112 in each of the detection blocks 111 may be scanned one by one, i.e., row by row and column by column, to obtain the grayscale values. Similarly, in a case of short scanning time, the total duration of the one by one scanning will not be long, which ensures the effectiveness of the coverage rate detection and the fingerprint detection. It should be noted that during the normal scanning operation of collecting the fingerprint images, the detection units 112 in the whole detection area 110 are scanned row by row and column by column, e.g., all of the 32 detection units 112 in the first row/column are scanned, then all of the 32 detection units 112 in the second row/column are scanned, until all of the 32 detection units 112 in the last row/column are scanned. However, in the embodiment of the present disclosure, the scanning operation of detecting the coverage rate is carried out in units of the detection block 111. Taking FIG. 2 as an example, 4×4 detection units 112 in the first detection block 111 are scanned firstly, and then 4×4 detection units 112 in the next detection block 111 are scanned, i.e., the detection blocks 111 are scanned one by one.

In some embodiments, it is also possible to scan only specific detection blocks 111. The specific detection blocks 111 may be parts of all the detection blocks 111, i.e., the number of the specific detection blocks 111 is less than that of all the detection blocks 111. But in order to ensure the effective detection of the coverage rate, the distribution range of the specific detection blocks 111 may be matched with the detection area 110. For example, the odd or the even rows/columns of detection blocks 111 may be set as the specific detection blocks 111, so that the number of the specific detection blocks 111 is less than the total number. When the coverage rate is detected, the accuracy of the measurement result of the coverage rate can be ensured since generally there is no object that only presses the even or the odd rows/columns of detection blocks 111.

S330: the fingerprint module determines whether each of the detection blocks is in a covered state based on the grayscale values.

After the grayscale value of each of the detection units 112 in the detection block 111 is obtained, the grayscale value may be used to determine whether each of the detection blocks 111 is in a covered state since there is a correspondence between the grayscale value and the sensing capacitance of the detection unit 112.

For example, the grayscale value is an 8-bit digital signal, and the range of the grayscale value is 0 to 255. In the fingerprint detection method, if the converted grayscale value is 0, it may indicate that there is an object attached to the surface of the corresponding detection unit 112; and if the converted grayscale value is 255, it may indicate that there is no object covering the surface of the corresponding detection unit 112. In practical applications, due to the influence of the external factors and the measurement deviation, it may be considered that there is an object covering the surface when the grayscale value is 0 to 60, and there is no object on the surface when the grayscale value is 200 to 255. The range may be adjusted according to the specific application situation, which is not limited here.

Since it can be determined whether the surface of the detection unit 112 is covered by an object based on the grayscale value, it may be determined whether the corresponding detection block 111 is in a covered state with the obtained grayscale values of all the detection units 112 in the detection block 111. The covered state indicates that the surface of a certain detection block 111 is covered by an object.

In some embodiments, whether the detection block 111 is in the covered state may be determined as follows: the grayscale values of all detection units 112 in the same detection block 111 are accumulated to obtain a block grayscale value to be compared with a preset gray detection threshold. If the block grayscale value is not greater than the gray detection threshold, it may indicate that the corresponding detection block 111 is in the covered state. On the contrary, if the block grayscale value is greater than the gray detection threshold, it may indicate that the corresponding detection block 111 is not in the covered state. Here, it still takes an example in which each of the detection blocks 111 includes 4×4 detection units 112. As mentioned above, in a case where a corresponding grayscale value is 0 to 60 when the surface of one detection unit 112 is covered by an object, in one embodiment, the gray detection threshold may be 60×16, or it may be adjusted within a range defined by this specific value. The present disclosure does not limit the specific number of the detection units 112 included in each of the detection blocks 111 or the specific value of the gray detection threshold.

In some other embodiments, a unit gray detection threshold may be set for the detection unit 112. After the grayscale values of all the detection units 112 in the detection block 111 are obtained, the grayscale value of each of the detection units 112 may be compared with the unit gray detection threshold in turn, thus determining whether each of the detection units 112 is covered. After that, the number of the covered detection units 112 in the detection block 111 may be counted, and if the number thereof is not less than a coverage unit threshold, it is determined that the detection block 111 is in the covered state, otherwise, it is determined that the detection block 111 is not in the covered state.

In the above two embodiments of step S330, the first one needs to accumulate all the grayscale values in the detection block 111, and then make a comparison; the second one needs to compare the grayscale value of each the detection units 112 in the detection block 111, and then make a counting and comparison. It can be seen that the implementation of the hardware of the first embodiment is simpler, while the second embodiment stops the comparison for the subsequent detection unit 112 once the count value reaches the coverage unit threshold.

To sum up, according to the embodiments of the present disclosure, the step S320, is taken the detection block 111 as a unit to scan the grayscale values; and the step S330 is taken the detection block 111 as a unit to determine whether it is in the covered state, so the hardware overhead is less than that of scanning the detection units 112 one by one in the detection area 110.

S340: the fingerprint module determines whether the number of the detection blocks in the covered state is not less than a coverage block threshold.

After it is determined whether each of the detection blocks 111 is in the covered state based on the above step, the number of all detection blocks 111 in the covered state may be counted and compared with the coverage block threshold.

The coverage block threshold is adopted to limit the number of corresponding detection blocks 111 in the covered state under the minimum coverage rate when the coverage rate of the detection area 110 meets a fingerprint collection standard. That is, if the number of the detection blocks 111 in the covered state is not less than the coverage block threshold, it is determined that the coverage rate of the surface of the current detection area 110 meets the fingerprint collection standard; and if the number of the detection blocks 111 in the covered state is less than the coverage block threshold, it is determined that the coverage rate does not meet the fingerprint collection standard.

Since the total number of the detection blocks 111 is definite, a ratio of the obtained number of the detection blocks 111 in the covered state to the total number of the detection blocks 111 is substantially equivalent to the coverage rate of the detection area 110, so that the coverage rate can be effectively determined based on this step.

It should be noted that according to the embodiments of the present disclosure, firstly the detection block 111 is taken as a unit to determine whether each of the detection blocks 111 is covered, and then the number of the detection blocks 111 in the covered state is counted to determine the coverage rate, which is advantageous as compared with the embodiment which accumulates the grayscale values of all detection units 112 in the detection area 110, and then compares the accumulated grayscale values with a certain threshold to determine the coverage rate. If all the grayscale values are accumulated, firstly it is difficult to determine the threshold for comparison, and secondly if a certain part of the detection area 110 is fully covered, the requirement on the coverage rate may also be met, which affects the accuracy of the judgment result. Thus, in the embodiments of the present disclosure, it is determined whether the coverage rate meets the requirement by counting the number of the detection blocks 111 in the covered state, which can effectively improve the accuracy of the judgment result.

If the number of the detection blocks 111 in the covered state is not less than the coverage block threshold, step S350 is performed, and a collection request is sent to the host 200 to inform the host 200 to obtain a fingerprint image, thus completing the subsequent fingerprint identification. If the number of the detection blocks 111 in the covered state is less than the coverage block threshold, it indicates that the coverage rate of the surface of the current detection blocks is small, which is probably an invalid coverage situation. In this case, the press may be ignored and step S310 is performed again for touch detection.

In some embodiments, in a case where the coverage rate is just detected for specific detection blocks based on the example in step S320, when a determination is performed in this step, it may only obtain the detection result of each of the specific detection blocks corresponding to the covered state, and count the number of the specific detection blocks in the covered state. Accordingly, in this detection mode, a corresponding specific coverage block threshold may be set for the number of the specific detection blocks, and the number of the specific coverage block threshold may be less than the coverage block threshold. When the number of the specific detection blocks in the covered state is not less than the specific coverage block threshold, the subsequent fingerprint detection step is performed. When the number of the specific detection blocks 111 in the covered state is less than the specific coverage block threshold, the press is ignored and step S310 is performed again for touch detection.

In some embodiments, in order to improve the accuracy of the coverage rate detection and avoid the influence of measurement errors, during the determination of the coverage rate, the operations of scanning, determining and counting may be performed at least twice at a preset detection interval, i.e., steps S320 to S340 are iteratively performed for multiple times, and each time the comparison result between the number of the detection blocks 111 in the covered state and the coverage block threshold is obtained. When the numbers of the detection blocks in the covered state detected by each of the scanning operations and determination operations are all greater than the coverage block threshold, the collection request is sent to the host 200, so as to avoid the situation that an invalid fingerprint identification operation is subsequently performed due to a certain false detection, and ensure the effectiveness of the fingerprint detection.

S350: the fingerprint module sends a collection request to a host.

If it is determined that the number of the detection blocks 111 in the covered state is not less than the coverage block threshold, it indicates that the coverage rate of the surface of the detection area 110 is high, and the image collected on the surface of the current detection area 110 has many feature points, so the probability of misjudgment is low, and the fingerprint image may be collected and identified.

The collection request may inform the host 200 in an interrupt mode that currently there is an object covering the surface of the detection area 110, and the fingerprint image collection and identification process may be started.

In some embodiments, in order to further reduce the overall power consumption, the host 200 is in a sleep state before receiving the collection request. In the sleep state, the host 200 stops the operation of any unnecessary module and only maintains the operations of some necessary models, thus keeping the power consumption as low as possible. The host 200 wakes up from the sleep state only when receiving the collection request, so as to ensure the standby time of the host 200.

S360: the host sends an image collection instruction to the fingerprint module.

Upon receipt of the collection request, the host 200 may perform the fingerprint identification process. In order to realize effective fingerprint identification, it is necessary to firstly obtain the fingerprint image of the fingerprint module 100. The image collection instruction is to inform the fingerprint module 100 to start the fingerprint image collection.

S370: the fingerprint module obtains a fingerprint image.

Upon receipt of the image collection instruction, the fingerprint module 100 may obtain the fingerprint image corresponding to a measured part. The measured part is an area of the surface of the object covering the detection area 110. Generally, the image collected based on the application environment of the fingerprint module 100 is corresponding to the fingerprint, but in practical applications, the collected image may be corresponding to any other covering object. Therefore, the expression of 'fingerprint image' is only to better fit the fingerprint detection method in the embodiments of the present disclosure, and does not mean that the fingerprint image is certainly corresponding to the fingerprint.

The fingerprint image may be corresponding to the grayscale value, and after the grayscale value of each of the detection units 112 is obtained during the detection of the coverage rate, the fingerprint image may be constructed based on the grayscale values of all the detection units 112.

In some embodiments, when a fingerprint image is to be obtained, the fingerprint module 100 may scan all the detection units 112 one by one (row by row and column by column) again upon receipt of the image collection instruction, obtain respective grayscale values, and construct a fingerprint image based on the obtained respective grayscale values.

S380: the fingerprint module transmits the fingerprint image to the host.

After the fingerprint image is obtained, the fingerprint module 100 may transmit the fingerprint image to the host 200 for subsequent identification steps.

In some embodiments, the fingerprint module 100 includes a memory, such as a cache memory (SRAM), to realize data caching. After the scanning operation for determining the coverage rate is performed, the fingerprint image may be constructed and temporarily stored in the memory, and then step 350 is performed to send the collection request to the host 200. Upon receipt of the image collection instruction fed back by the host 200 (step S360), the fingerprint module 100 may read the fingerprint image from the memory and transmit the temporarily stored fingerprint image to the host 200 for the fingerprint identification.

In some embodiments, if there is no memory in the fingerprint module 100, i.e., the fingerprint image cannot be cached in the memory in advance, upon receipt of the image collection instruction fed back by the host 200 (step S360), the fingerprint module may scan the detection units 112 one by one to obtain the grayscale values of the detection units 112 and send the grayscale values to the host. For example, when the fingerprint module 100 scans the detection units 112 one by one, the collected grayscale values may be sent to the host 200 in turn, so that the host 200 constructs the corresponding fingerprint image based on the received grayscale values, which can also realize the fingerprint identification.

S390: the host determines an identification result based on the fingerprint image.

Upon receipt of the fingerprint image, the host 200 may identify based on the fingerprint image. At least one preset fingerprint template may be stored in the host 200 in advance, and the preset fingerprint template may be a pre-collected fingerprint image corresponding to a login user. In the process of the fingerprint identification, the fingerprint image may be compared with the preset fingerprint template, and if there is a preset fingerprint template matched with the fingerprint image, it means that the identification of the current fingerprint image is successful. Based on the unique characteristics of the fingerprint, when the identification is successful, it may be proved that the fingerprint image is corresponding to the fingerprint of the login user, and the corresponding operation permission may be granted to the current user to perform subsequent related operations.

The detection result may include a matched fingerprint and a mismatched fingerprint. In a case of the matched fingerprint, generally a user having a login qualification is in the current fingerprint identification, and subsequent operations may be performed.

Specifically, in the process of obtaining the detection result by comparing the preset fingerprint template with the fingerprint image, a fingerprint curve feature vector which is corresponding to the fingerprint image may be extracted firstly. Generally, the fingerprint is composed of curves have corresponding features and may be used to distinguish different fingerprints. The fingerprint curve feature vector includes at least one feature point, through which different fingerprints may be distinguished.

Accordingly, the preset fingerprint template is corresponding to a plurality of feature points. After the fingerprint curve feature vector of the fingerprint image is determined, it may be compared with the preset fingerprint template to determine the number of the feature points matched with the preset fingerprint template. When the number of the feature points is not less than a feature point number threshold, it means that the fingerprint corresponding to the fingerprint image is similar to the preset fingerprint template and matched therewith, and the fingerprint corresponding to the fingerprint image may be identified successfully.

On the contrary, if the number of the feature points is less than the feature point number threshold, the fingerprint of the fingerprint image is not matched with the preset fingerprint template, and the identification is failed.

In some embodiments, the fingerprint image may also be preprocessed before being identified. The pre-processing removes the image noise and improves the quality of the fingerprint image. Specifically, the preprocessing may remove pseudo-feature points in the fingerprint image. The pseudo-feature points are false feature points generated during the image collection, and will interfere with the feature comparison process. For example, the pseudo-feature points may include burrs, short ridges, etc., and the preprocessing may remove false feature points in the fingerprint image by a corresponding algorithm, thus ensuring the accuracy of the fingerprint image.

After the fingerprint image is preprocessed, the fingerprint image may be identified based on the above operation to determine the identification result, thus ensuring the accuracy of the identification result.

It should be noted that the host 200 in the fingerprint detection system may be a processing module located in the terminal device, or a micro-processing unit provided in the fingerprint module 100.

In a case where the host 200 is provided in the terminal device, after being obtained by the fingerprint module 100, a fingerprint image is directly transmitted to the host 200 of the terminal device through an SPI interface for example, and the host 200 performs a fingerprint identification and determines an identification result. After the host 200 determines the identification result, subsequent corresponding operations may be performed by the host 200 or any other processing module in the terminal device based on a corresponding logic.

In a case where the host 200 is a micro-processing unit built in the fingerprint module 100, since the micro-processing unit also has the capabilities of data analysis and processing, the fingerprint image may be directly identified by the micro-processing unit after being transmitted to the micro-processing unit through the SPI interface for example.

Since the micro-processing unit is independent of the terminal device, a communication process of transmitting the fingerprint image only involves a communication between the fingerprint module and the micro-processing unit, and it is unnecessary to transmit any information to the terminal device, and in a case where the terminal device is in a sleep state, it is also unnecessary to wake up the terminal device.

After the identification result is determined, the built-in micro-processing unit of the fingerprint module 100 may directly send the identification result to the terminal device, so that the terminal device can directly perform the corresponding operation according to the identification result.

A specific example given for illustration, in which in a case where the terminal device is a smart phone, if the identification result determined based on the micro-processing unit is a matched fingerprint, the identification result will be sent to the terminal device to wake up the terminal device, and the power-on lock screen will be automatically unlocked to directly display the interface content of the smart phone. If the identification result is a mismatched fingerprint, the terminal device may also wake up and display 'the fingerprint is incorrect, please place your finger again' on the screen to prompt the user to perform a fingerprint detection again.

Based on the introduction to the above embodiments, when a fingerprint detection is to be performed in the fingerprint detection method, firstly each of the detection blocks is scanned by the fingerprint module to obtain the grayscale value of each of the detection units in the detection block. It is determined whether each of the detection blocks is in the covered state based on the grayscale value of each of the detection units in the detection block. The number of the detection blocks in the covered state is counted, and when the number is not less than the coverage block threshold, it is considered that the coverage rate of the surface of the detection area meets the requirement of fingerprint detection, and subsequent operations of fingerprint collection and identification may be performed. With the above method, before the fingerprint collection is performed, the determination and judgment of the coverage rate in the current detection area is realized based on the fingerprint module itself, and the fingerprint image will not be collected or identified unless the coverage rate meets a certain requirement, which not only avoids meaningless detection caused by a false touch, but also ensures the integrity of the fingerprint image collected later, thus improving the accuracy of the identification result, and ensuring the practical application effect of the fingerprint identification. In addition, in the embodiments of the present disclosure, firstly the grayscale values are scanned in units of the detection blocks to determine whether each of the detection blocks is in the covered state, and then the coverage rate is determined based on the number of the blocks in the covered state, which can avoid the influence of the grayscale values of a local detection area on the overall coverage rate and make the judgment of the coverage rate more accurate. In addition, compared with the scanning of the whole detection area, the hardware overhead is smaller when scanning the grayscale values in units of the detection blocks.

Figure 5:
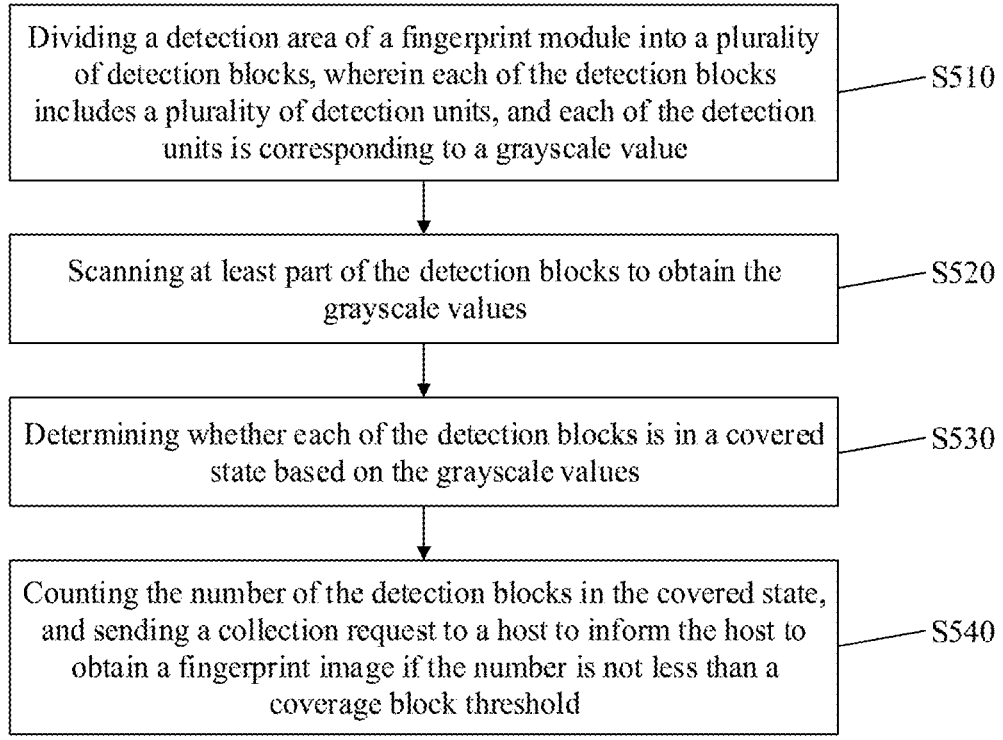
FIG. 5 is a flowchart of a fingerprint detection method according to an embodiment of the present disclosure.

Based on the fingerprint detection method corresponding to FIG. 3, the embodiments of the present disclosure further propose a fingerprint detection method. The fingerprint detection method is performed by a fingerprint module. As illustrated in FIG. 5, the fingerprint detection method specifically may include the following steps.

S510: dividing a detection area of a fingerprint module into a plurality of detection blocks, wherein each of the detection blocks includes a plurality of detection units, and each of the detection units is corresponding to a grayscale value.

For the introduction to this step, please refer to the description of the detection block in the fingerprint detection system, which will not be repeated here.

S520: scanning at least part of the detection blocks to obtain the grayscale values.

For the introduction to this step, please refer to the description of steps S310 and S320, which will not be repeated here.

S530: determining whether each of the detection blocks is in a covered state based on the grayscale values.

For the introduction to this step, please refer to the description of step S330, which will not be repeated here.

S540: counting the number of the detection blocks in the covered state, and sending a collection request to a host to inform the host to obtain a fingerprint image if the number is not less than a coverage block threshold.

For the introduction to this step, please refer to the description of steps S340, S350, S360, S370, S380 and S390, which will not be repeated here.

Although the processes described above includes a plurality of operations occurring in a particular order, it should be clearly understood that those processes may include more or less operations which may be performed sequentially or in parallel (e.g., using a parallel processor or a multi-threaded environment).

This disclosure is set forth by referring to flow charts and/or block diagrams for the methods, devices (systems), and computer program products of the embodiments. It should be understood that each process and/or block of the flow charts and/or block diagrams as well as combinations of the processes and/or boxes of the flow charts and/or block diagrams can be realized by computer program instructions. These computer program instructions can be provided to general-purpose computers, special-purpose computers, embedded processors or the processors of other programmable data processing devices to produce a machine, so that an apparatus for implementing the functions designated in one or more processes of the flowcharts and/or one or more blocks of the block diagrams can be produced by the instructions executed by the processor of the computer or other programmable data processing device.

These computer program instructions can also be stored in a computer-readable storage medium which can guide a computer or other programmable data processing device to operate in a particular way, so that an article of manufacture comprising an instruction apparatus can be produced by the instructions stored in the storage medium, with the instruction apparatus implementing the functions designated in one or more processes of the flowcharts and/or one or more blocks of the block diagram.

These computer program instructions may also be loaded onto a computer or other programmable data processing device to make the computer or other programmable data processing device perform a sequence of computer-implemented operations, so that the instructions executed by the computer or other programmable data processing device realize one or more processes of the flowcharts and/or one or more blocks of the block diagram.

In a typical configuration, the computing device includes one or more processors (CPUs), an input/output interface, a network interface and a memory.

The memory may have the form of a volatile memory, a Random-Access Memory (RAM) and/or a nonvolatile memory such as Read-Only Memory (ROM) or a flash RAM, etc., among the computer readable medium. The memory is an example of the computer readable medium.

The computer-readable medium includes permanent or non-permanent, and removable or non-removable media, which can realize the information storage in any method or technique. The information can be computer readable instructions, data structures, program modules or other data. An example of the computer storage medium includes, but not limited to, a phase change memory (PRAM), a static random access memory (SRAM), a dynamic random access memory (DRAM), other types of random access memory (RAM), a read-only memory (ROM), an electrically-erasable programmable read-only memory (EEPROM), a flash memory or other memory techniques, a compact disk read only memory (CD-ROM), a digital versatile disc (DVD) or other optical storages, magnetic cassette tapes, magnetic diskettes or other magnetic storage device or any other non-transmission medium, which can be used for the storage of information accessible to a computing device. According to the definitions herein, the computer readable medium does not include any temporary computer readable media (transitory media), such as modulated data signal and carrier wave.

A person skilled in the art should appreciate that any embodiment of the present disclosure can be provided as a method, a system or a computer program product. Therefore, the present disclosure can take the form of a full hardware embodiment, a full software embodiment, or an embodiment combining software and hardware. Moreover, the present invention can take the form of a computer program product implemented on one or more computer usable storage mediums (including, but not limited to, a magnetic disc memory, CD-ROM, optical storage, etc.) containing therein computer usable program codes.

The present disclosure may be described in the general context of computer executable instructions executed by the computer, e.g., the program module. In general, the program module includes routine, program, object, component, data structure, etc. executing a particular task or realizing a particular abstract data type. The present disclosure may also be put into practice in the distributed computing environments where tasks are executed by remote processing devices connected through a communication network. In the distributed computing environments, the program modules may be located in the local and remote computer storage medium including the storage device.

The embodiments herein are all described in a progressive manner, and the same or similar portions of the embodiments can refer to each other. Each embodiment lays an emphasis on its distinctions from other embodiments. In particular, the system embodiment is simply described since it is substantially similar to the method embodiment, and please refer to the descriptions of the method embodiment for the relevant portion. In the description of the present disclosure, the description of reference terms 'one embodiment', 'some embodiments', 'an example', 'a specific example' or 'some examples' and the like mean that the specific features, structures, materials, or characteristics described in conjunction with the embodiment(s) or example(s) are included in at least one embodiment or example of the present disclosure. In the present disclosure, the schematic expressions of the above terms do not necessarily aim at the same embodiment or example. Moreover, the specific features, structures, materials, or characteristics described may be combined in any one or more embodiments or examples in a suitable manner. In addition, a person skilled in the art can combine different embodiments or examples described in the present disclosure and features thereof if there is no contradiction.

Those described above are just embodiments of the present disclosure, rather than limitations thereto. For a person skilled in the art, the present disclosure may have various amendments or variations. Any amendment, equivalent substitution, improvement, etc. made under the spirit and principle of the present disclosure should fall within the scope of the claims of the present disclosure.

What is claimed is:

1. A fingerprint detection method for applying to a fingerprint module, comprising:
dividing a detection area of the fingerprint module into a plurality of detection blocks, wherein each of the detection blocks comprises a plurality of detection units, and each of the detection units is corresponding to a grayscale value;
scanning at least part of the detection blocks to obtain the grayscale values;
determining whether each of the detection blocks is in a covered state based on the grayscale values, comprising:
accumulating the grayscale value of each of the detection units in the detection block to obtain a block grayscale value; and
determining that the detection block is in the covered state, in response to the block grayscale value is not greater than a gray detection threshold; and
counting a number of the detection blocks in the covered state, and sending a collection request to a host to inform the host to obtain a fingerprint image if the number is not less than a coverage block threshold.

2. The method according to claim 1, wherein scanning at least part of the detection blocks to obtain the grayscale values comprises:
scanning each of the detection units in specific detection blocks one by one to obtain the grayscale values, wherein the specific detection blocks are parts of all the detection blocks, and a distribution range of the specific detection blocks is matched with the detection area.

3. The method according to claim 1, wherein scanning at least part of the detection blocks to obtain the grayscale values comprises:
scanning each of the detection units of all the detection blocks one by one to obtain the grayscale values.

4. The method according to claim 1, wherein
performing operations of the scanning, the determining and the counting at least twice at a preset detection interval;
sending the collection request to the host, if the numbers of the detection blocks in the covered stated determined through the operations of the scanning, the determining and the counting are all not less than the coverage block threshold.

5. The method according to claim 1, further comprising:
scanning a plurality of specific detection units at an interval of a predetermined time period to obtain touch grayscale values;
accumulating the touch grayscale values of the plurality of specific detection units to obtain a touch accumulation value; and
performing the step of scanning at least part of the detection blocks to obtain the grayscale values, if the touch accumulation value is not greater than a touch threshold.

6. The method according to claim 1, further comprising:
performing the step of scanning at least part of the detection blocks to obtain the grayscale values upon receipt of a sensing signal, wherein the sensing signal is generated by a metal ring provided on a surface of the fingerprint module in response to being touched.

7. The method according to claim 1, wherein the detection unit comprises a capacitance sensing unit, and a sensing capacitance of the capacitance sensing unit decreases as the grayscale value increases.

8. The method according to claim 1, wherein the host is in a sleep state before receiving the collection request.

9. The method according to claim 1, further comprising the following steps after sending the collection request to the host:
scanning all the detection units one by one to construct the fingerprint image upon receipt of an image collection instruction sent by the host; and sending the fingerprint image to the host, so that the host can perform a fingerprint identification based on the fingerprint image.

10. The method according to claim 1, wherein
the method further comprises the following steps before sending the collection request to the host:
constructing the fingerprint image based on the grayscale values of all the detection units; and
temporarily storing the fingerprint image;
the method further comprises the following step after sending the collection request to the host:
sending the temporarily stored fingerprint image to the host upon receipt of an image collection instruction sent by the host.

11. The method according to claim 1, wherein the host is a micro-processing unit in the fingerprint module; the method further comprises the following steps after sending the collection request to the host:
sending the fingerprint image to the micro-processing unit, so that the micro-processing unit can determine an identification result based on the fingerprint image; and
sending the identification result to a terminal device.

12. The method according to claim 1, wherein the host is provided in a terminal device;
the method further comprises the following step after sending the collection request to the host:
sending the fingerprint image to the terminal device, so that the host in the terminal device can determine an identification result based on the fingerprint image.

13. A fingerprint module, comprising:
a detection area which is divided into a plurality of detection blocks, wherein each of the detection blocks comprises a plurality of detection units, and each of the detection units is corresponding to a grayscale value; and
a hardware circuit comprising:
a scan module configured to scan at least part of the detection blocks to obtain the grayscale values;
a coverage determination module configured to determine whether each of the detection blocks is in a covered state based on the grayscale values, and configured to:
accumulate the grayscale value of each of the detection units in the detection block to obtain a block grayscale value; and
determine that the detection block is in the covered state, in response to the block grayscale value is not greater than a gray detection threshold;
a counting module configured to count a number of the detection blocks in the covered state; and
an interruption module configured to send a collection request to a host to inform the host to obtain a fingerprint image in response to the number is not less than a coverage block threshold.

14. The fingerprint module according to claim 13, wherein the scan module is further configured to:
scan each of the detection units in specific detection blocks one by one to obtain the grayscale values, wherein the specific detection blocks are parts of all the detection blocks, and a distribution range of the specific detection blocks is matched with the detection area.

15. The fingerprint module according to claim 13, wherein the scan module is further configured to:
scan each of the detection units of all the detection blocks one by one to obtain the grayscale values.

16. The fingerprint module according to claim 13, wherein the hardware circuit is further configured to:
scan all the detection units one by one to construct the fingerprint image upon receipt of an image collection instruction sent by the host after the collection request is sent to the host; and
send the fingerprint image to the host, so that the host can perform a fingerprint identification based on the fingerprint image.

17. A fingerprint detection method for applying to a fingerprint module, comprising:
dividing a detection area of the fingerprint module into a plurality of detection blocks, wherein each of the detection blocks comprises a plurality of detection units, and each of the detection units is corresponding to a grayscale value;
scanning at least part of the detection blocks to obtain the grayscale values;
determining whether each of the detection blocks is in a covered state based on the grayscale values, comprising:
determining whether each of the detection units is covered based on the grayscale value thereof; and
counting a number of the covered detection units, and determining that the detection block is in the covered state in response to the number of the covered detection units is not less than a coverage unit threshold; and
counting a number of the detection blocks in the covered state, and sending a collection request to a host to inform the host to obtain a fingerprint image in response to the number of the detection blocks in the covered state is not less than a coverage block threshold.

* * * * *